(12) United States Patent
Astaix et al.

(10) Patent No.: US 10,471,774 B2
(45) Date of Patent: *Nov. 12, 2019

(54) RADIAL TIRE HAVING A LIGHTWEIGHT BELT STRUCTURE

(71) Applicants: COMPAGNIE GENERALE DES ETABLISSEMENTS MICHELIN, Clermont-Ferrand (FR); Michelin Recherche et Technique S.A., Granges-Paccot (FR)

(72) Inventors: Camille Astaix, Clermont-Ferrand (FR); Odile Tadjoa, Clermont-Ferrand (FR); Aurore Lardjane, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 600 days.

This patent is subject to a terminal disclaimer.

(21) Appl. No.: 14/908,373

(22) PCT Filed: Jul. 8, 2014

(86) PCT No.: PCT/EP2014/064559
§ 371 (c)(1),
(2) Date: Jan. 28, 2016

(87) PCT Pub. No.: WO2015/014574
PCT Pub. Date: Feb. 5, 2015

(65) Prior Publication Data
US 2016/0193879 A1  Jul. 7, 2016

(30) Foreign Application Priority Data
Jul. 30, 2013 (FR) ..................... 13 57498

(51) Int. Cl.
 *B60C 9/22* (2006.01)
 *B60C 9/18* (2006.01)
 (Continued)

(52) U.S. Cl.
 CPC .......... *B60C 9/2009* (2013.01); *B60C 9/0007* (2013.01); *B60C 9/0042* (2013.01);
 (Continued)

(58) Field of Classification Search
 CPC ....... B60C 9/0064; B60C 9/22; B60C 9/2009; B60C 2009/2067; B60C 2009/2077;
 (Continued)

(56) References Cited

U.S. PATENT DOCUMENTS 3,638,706 A  2/1972  Wilson et al.
3,929,180 A  12/1975  Kawase et al.
(Continued)

FOREIGN PATENT DOCUMENTS

DE  10 2009 025 793 A1  8/2010
EP  0 043 563 A1  1/1982
(Continued)

OTHER PUBLICATIONS

B. Yilmaz, "Investigation of Twisted Monofilament Cord Properties Made of Nylon 6.6 and Polyester", Fibers and Polymers, vol. 12, No. 8, pp. 1091-1098 (2011).

*Primary Examiner* — Adrienne C. Johnstone
(74) *Attorney, Agent, or Firm* — Venable LLP

(57) ABSTRACT

A radial tire with a lightened belt structure (10) comprises a multilayer composite laminate (10a, 10b, 10c) of specific construction, with a first layer (10a) of rubber (C1) reinforced with preferably weakly heat-shrinkable circumferential textile monofilaments (110) with a diameter greater than 0.10 mm or assemblies of such monofilaments, for example, made of nylon or of polyester, this first layer radially (in the (Continued)

Figure 1:
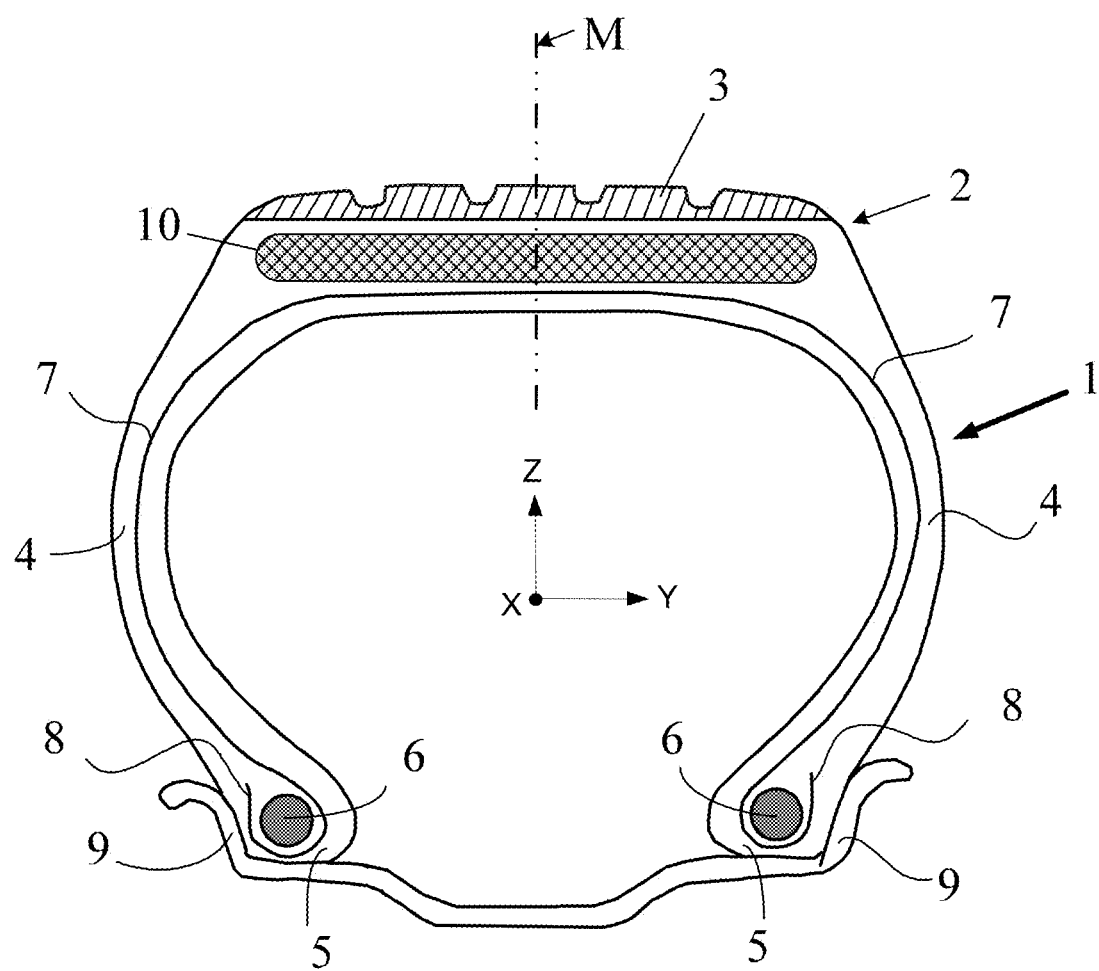

direction Z) surmounting two other layers (10b, 10c) of rubber (C2, C3, respectively) reinforced with monofilaments (120, 130) of high tensile steel. The first reinforcers have an envelope diameter between 0.20 mm and 1.20 mm and a density, measured in the axial direction Y, between 70 and 130 threads/dm, and the second and third reinforcers each have a diameter between 0.20 mm and 0.50 mm and a density, measured in the axial direction Y, between 100 and 180 threads/dm.

20 Claims, 4 Drawing Sheets

(51) Int. Cl.
| | | |
|---|---|---|
| *B60C 9/20* | (2006.01) | |
| *B60C 9/00* | (2006.01) | |
| *B60C 9/02* | (2006.01) | |
| *B60C 11/00* | (2006.01) | |
| *B60C 13/00* | (2006.01) | |
| *B60C 15/00* | (2006.01) | |

(52) U.S. Cl.
CPC .............. *B60C 9/0064* (2013.01); *B60C 9/02* (2013.01); *B60C 11/00* (2013.01); *B60C 13/00* (2013.01); *B60C 15/00* (2013.01); *B60C 2009/0035* (2013.01); *B60C 2009/0071* (2013.01); *B60C 2009/2012* (2013.01); *B60C 2009/2016* (2013.01); *B60C 2009/2067* (2013.01); *B60C 2009/2074* (2013.01); *B60C 2009/2077* (2013.01); *B60C 2009/2083* (2013.01); *Y02T 10/862* (2013.01)

(58) Field of Classification Search
CPC .... B60C 2009/2083; B60C 2009/2247; B60C 2009/2257; B60C 2009/2266
USPC ................................ 152/527, 451, 526, 531
See application file for complete search history.

(56) References Cited

U.S. PATENT DOCUMENTS

| | | | |
|---|---|---|---|
| 4,284,117 A | 8/1981 | Poque et al. | |
| 4,371,025 A | 2/1983 | Canevari et al. | |
| 4,724,881 A | 2/1988 | Poque et al. | |
| 4,819,705 A | 4/1989 | Caretta | |
| 5,032,198 A * | 7/1991 | Kojima | ............ 152/531 |
| 5,365,781 A | 11/1994 | Rhyne | |
| 5,427,165 A | 6/1995 | Balestra et al. | |
| 5,427,166 A | 6/1995 | Willard, Jr. | |
| 5,442,903 A | 8/1995 | Lagarrigue | |
| 5,511,599 A | 4/1996 | Willard, Jr. | |
| 5,711,829 A | 1/1998 | Pollard et al. | |
| 5,858,137 A | 1/1999 | Assaad et al. | |
| 6,105,647 A | 8/2000 | Champilou et al. | |
| 6,581,662 B2 | 6/2003 | Yukawa et al. | |
| 6,923,234 B2 | 8/2005 | Bestgen et al. | |
| 7,438,104 B2 | 10/2008 | Morii et al. | |
| 9,902,204 B2 * | 2/2018 | Lardjane | ............... B60C 9/0064 |
| 9,919,563 B2 * | 3/2018 | Lardjane | ............... B60C 9/0064 |
| 2002/0011296 A1 | 1/2002 | Miyazaki et al. | |
| 2002/0055583 A1 | 5/2002 | Iizuka et al. | |
| 2010/0300595 A1 | 12/2010 | Imhoff et al. | |
| 2011/0240199 A1 | 10/2011 | Reese et al. | |
| 2014/0069563 A1 | 3/2014 | Le Clerc | |
| 2015/0007922 A1 | 1/2015 | Lardjane et al. | |
| 2015/0013873 A1 | 1/2015 | Lardjane et al. | |
| 2015/0136298 A1 | 5/2015 | Huyghe et al. | |
| 2016/0159155 A1 * | 6/2016 | Astaix | ................... B60C 9/0064 152/527 |

FOREIGN PATENT DOCUMENTS

| | | |
|---|---|---|
| EP | 0 414 892 B1 | 3/1991 |
| EP | 0 500 480 A1 | 8/1992 |
| EP | 0 517 870 B1 | 7/1996 |
| EP | 0 738 615 A2 | 10/1996 |
| EP | 0 795 426 A1 | 9/1997 |
| EP | 1 066 989 A2 | 1/2001 |
| EP | 1 162 086 A2 | 12/2001 |
| EP | 1 184 203 A2 | 3/2002 |
| EP | 2 261 059 A2 | 12/2010 |
| FR | 1 495 730 A | 9/1967 |
| FR | 2 022 643 A1 | 7/1970 |
| FR | 2 443 342 A1 | 7/1980 |
| FR | 2 504 067 A1 | 10/1982 |
| FR | 2 577 478 A1 | 8/1986 |
| GB | 2 096 950 A | 10/1982 |
| JP | 1-229704 A | 9/1989 |
| JP | 11-78411 H | 3/1999 |
| JP | 2001-322404 A | 11/2001 |
| JP | 2002-029214 A | 1/2002 |
| JP | 2011-251583 A | 12/2011 |
| WO | 2010/143017 A1 | 12/2010 |
| WO | WO-2013/117476 A1 * | 8/2013 |
| WO | WO-2013/117477 A1 * | 8/2013 |

* cited by examiner

RADIAL TIRE HAVING A LIGHTWEIGHT BELT STRUCTURE

1. FIELD OF THE INVENTION

The present invention relates to tyres and to the crown reinforcement or belt thereof. It relates more specifically to the multilayer composite laminates used in the belt of radial tyres, notably for passenger vehicles or vans.

2. PRIOR ART

A tyre with a radial carcass reinforcement for a passenger vehicle or van comprises, as is known, a tread, two inextensible beads, two flexible sidewalls connecting the beads to the tread and a rigid crown reinforcement or "belt" arranged circumferentially between the carcass reinforcement and the tread.

The tyre belt is generally made up of at least two rubber plies referred to as "working plies", "triangulation plies" or even "working reinforcement" which are superposed and crossed, usually reinforced with metal cords disposed substantially parallel to one another and inclined with respect to the median circumferential plane, it being possible for these working plies to be associated or not to be associated with other plies and/or fabrics in rubber. These working plies have the prime function of giving the tyre high drift thrust or cornering stiffness which, in the known way, is necessary for achieving good road holding ("handling") on the motor vehicle.

The above belt, and this is particularly true of tyres liable to run at sustained high speeds, may further comprise a rubber ply, referred to as "hooping ply" or "hoop reinforcement", which is generally reinforced with reinforcing threads referred to as "circumferential", which means to say that these reinforcing threads are disposed practically parallel to one another and extend substantially circumferentially around the tyre casing to form an angle preferably in a range from 0 to 5° with the median circumferential plane. It will be recalled that the prime role of these reinforcing threads is to withstand the centrifugation of the crown at high speed.

Such belt structures, which ultimately consist of a multilayer composite laminate comprising at least one hooping ply, usually textile, and two working plies, generally of metal, are well known to a person skilled in the art and do not need to be described in greater detail here. The prior art describing such belt structures is illustrated notably by patent documents EP 43 563 or U.S. Pat. No. 4,371,025, FR 2 443 342 or U.S. Pat. No. 4,284,117, FR 2 504 067 or U.S. Pat. No. 4,819,705, EP 738 615, EP 795 426 or U.S. Pat. No. 5,858,137, EP 1 162 086 or US 2002/0011296, EP 1 184 203 or US 2002/0055583, EP 2 261 059 or US 2010/300595.

The availability of increasingly strong and durable steels means that tyre manufacturers are nowadays, as far as possible, tending towards the use in tyre belts of cords of a very simple structure, notably having just two threads, or even of individual filaments, in order on the one hand to simplify the manufacture and reduce costs, and on the other hand to reduce the thickness of the reinforcing plies and thus the hysteresis of the tyres, and ultimately reduce the energy consumption of the vehicles fitted with such tyres.

However, efforts aimed at reducing the mass of the tyres, in particular by reducing the thickness of their belt and of the layers of rubber of which it is made do, quite naturally, come up against physical limits which may give rise to a number of difficulties. Notably, the hooping function afforded by the hooping reinforcement and the stiffening function afforded by the working reinforcement may turn out no longer to be sufficiently differentiated from one another and may disturb one another, not to mention the risks of direct contact between the textile circumferential threads and the metal cords of the working plies. Of course, all of that is detrimental to the correct operation of the tyre crown, and to the performance and overall endurance of the tyre.

3. BRIEF DESCRIPTION OF THE INVENTION

During the course of their research, the applicant companies have discovered a multilayer composite laminate with a specific structure that allows the belt of the tyres to be lightened appreciably, thus lowering their rolling resistance, while alleviating the abovementioned drawbacks.

Thus, a first subject of the present invention relates (according to the references given in the appended FIGS. 1 and 2) to a radial tyre (1), defining three main directions, circumferential (X), axial (Y) and radial (Z), comprising a crown (2) surmounted by a tread (3), two sidewalls (4), two beads (5), each sidewall (4) connecting each bead (5) to the crown (2), a carcass reinforcement (7) that is anchored in each of the beads (5) and extends in the sidewalls (4) as far as the crown (2), a crown reinforcement or belt (10) that extends in the crown (2) in the circumferential direction (X) and is situated radially between the carcass reinforcement (7) and the tread (3), said belt (10) comprising a multilayer composite laminate (10a, 10b, 10c) comprising at least three superposed layers of reinforcers (110, 120, 130), said reinforcers being unidirectional within each layer and embedded in a thickness of rubber (C1, C2, C3), with:

- on the tread side, a first layer (10a) of rubber (C1) comprising a first row of reinforcers (110) which are oriented at an angle alpha of −5 to +5 degrees with respect to the circumferential direction (X), these reinforcers (110), referred to as first reinforcers, being made of a heat-shrinkable textile material;
- in contact with the first layer (10a) and disposed beneath the latter, a second layer (10b) of rubber (C2) comprising a second row of reinforcers (120) which are oriented at a given angle beta, positive or negative, of between 10 and 30 degrees with respect to the circumferential direction (X), these reinforcers (120), referred to as second reinforcers, being metal reinforcers;
- in contact with the second layer (10b) and disposed beneath the latter, a third layer (10c) of rubber (C3) comprising a third row of reinforcers (130) which are oriented at an angle gamma the opposite of the angle beta, said angle gamma itself being between 10 and 30 degrees with respect to the circumferential direction (X), these reinforcers (130), referred to as third reinforcers, being metal reinforcers;

this tyre being characterized in that:
- the first reinforcers (110) made of heat-shrinkable textile material are monofilaments with a diameter or thickness φ greater than 0.10 mm, or assemblies of such monofilaments;
- the envelope diameter denoted D1 of the first reinforcers (110) is between 0.20 mm and 1.20 mm;
- the density $d_1$ of the first reinforcers (110) in the first layer of rubber (C1), measured in the axial direction (Y), is between 70 and 130 threads/dm;
- the second (120) and third (130) reinforcers are steel monofilaments of which the diameter or thickness, denoted D2 and D3, respectively, is between 0.20 mm and 0.50 mm;

the density, $d_2$ and $d_3$, respectively, of the second (120) and third (130) reinforcers in the second (C2) and third (C3) layers of rubber respectively, measured in the axial direction (Y), is between 100 and 180 threads/dm.

By virtue of its specific construction and the combination of the above features, this multilayer composite laminate has proven itself capable of reducing the weight of tyres and their rolling resistance, at a cost that is lower by virtue of the use of steel monofilaments that do not require any prior assembling operation, all this being achieved without penalizing the cornering stiffness or the endurance under particularly harsh running conditions.

It also affords the advantage of having very low hysteresis compared with the laminates conventionally used in the belts of tyres of the passenger vehicle or van type.

The multilayer composite laminate according to the invention can be used as a belt reinforcing element for any type of tyre, particularly for passenger vehicles notably including 4×4 s and SUVs (Sport Utility Vehicles) or for vans.

BRIEF DESCRIPTIONS OF THE DRAWINGS

The invention and its advantages will be readily understood in the light of the following detailed description and exemplary embodiments, and also FIGS. 1 to 4 relating to these embodiments, which schematically show (unless otherwise indicated, not to a specific scale):

- in radial section (which means a section in a plane containing the axis of rotation of the tyre), an example of a tyre (1) according to the invention, incorporating within its belt (10) a multilayer composite laminate according to the invention (FIG. 1);
- in cross section, two examples of a multilayer composite laminate (10a, 10b, 10c) used in the tyre (1) according to the invention, using reinforcers (110) made of heat-shrinkable textile material in the form of an assembly of monofilaments (FIG. 2) or of an individual monofilament (FIG. 3), respectively;
- in cross section, various examples of possible assemblies of monofilaments (111) made of heat-shrinkable textile material that are usable as reinforcers (110) in the first layer (10a) of the multilayer composite laminate according to the invention (FIGS. 4A-4F).

4. DEFINITIONS

Terms in the present application are understood as follows:

"rubber" or "elastomer" (the two terms being considered to be synonymous): any type of elastomer, be it of the diene type or the non-diene type, for example thermoplastic;

"rubber composition" or "rubbery composition": a composition which contains at least one rubber and one filler;

"layer": a sheet, strip or any other element the thickness of which is relatively small compared to its other dimensions, preferably in which the ratio of thickness to the largest of the other dimensions is less than 0.5, more preferably less than 0.1;

"axial direction": a direction substantially parallel to the axis of rotation of the tyre;

"circumferential direction": a direction which is substantially perpendicular both to the axial direction and to a radius of the tyre (in other words, tangential to a circle the centre of which lies on the axis of rotation of the tyre);

"radial direction": a direction along a radius of the tyre, that is to say any direction that passes through the axis of rotation of the tyre and is substantially perpendicular to this direction, that is to say makes an angle of no more than 5 degrees with a perpendicular to this direction;

"oriented along an axis or in a direction": when speaking of any element such as a reinforcer, an element which is oriented substantially parallel to this axis or this direction, that is to say makes an angle of no more than 5 degrees (and thus zero or at most equal to 5 degrees) with this axis or this direction;

"oriented perpendicularly to an axis or a direction": when speaking of any element such as a reinforcer, an element which is oriented substantially perpendicularly to this axis or this direction, that is to say makes an angle of no more than 5 degrees with a perpendicular to this axis or this direction;

"median circumferential plane" (denoted M): the plane perpendicular to the axis Y of rotation of the tyre which is situated mid-way between the two beads and passes through the middle of the crown reinforcement or belt;

"reinforcer" or "reinforcing thread": any long and slender strand, that is to say any longilinear, filiform strand with a length that is long in relation to its cross section, notably any individual filament, any multifilament fibre or any assembly of such filaments or fibres such as a folded yarn or a cord, it being possible for this strand or thread to be rectilinear or non-rectilinear, for example twisted, or crimped, such a strand or thread being able to reinforce a rubber matrix (that is to say to improve the tensile properties of the matrix);

"unidirectional reinforcers": reinforcers that are essentially mutually parallel, that is to say oriented along one and the same axis;

"laminate" or "multilayer laminate": within the meaning of the International Patent Classification, any product comprising at least two layers, of flat or non-flat form, which are in contact with one another, it being possible for the latter to be or not to be joined or connected together; the expression "joined" or "connected" should be interpreted broadly so as to include all means of joining or assembling, in particular via adhesive bonding.

Furthermore, unless expressly indicated otherwise, all the percentages (%) indicated are % by weight.

Any range of values denoted by the expression "between a and b" represents the range of values extending from more than a to less than b (that is to say excluding the end points a and b) whereas any range of values denoted by the expression "from a to b" means the range of values extending from a up to b (that is to say including the strict end points a and b).

5. DETAILED DESCRIPTION OF THE INVENTION

By way of example, FIG. 1 very schematically shows (that is to say without being drawn to any particular scale) a radial section through a tyre according to the invention, for example for a vehicle of the passenger vehicle or van type, the belt of which comprises a multilayer composite laminate according to the invention.

This tyre (1) according to the invention, defining three perpendicular directions, circumferential (X), axial (Y) and radial (Z), comprises a crown (2) surmounted by a tread (3), two sidewalls (4), two beads (5), each sidewall (4) connecting each bead (5) to the crown (2), a carcass reinforcement (7) that is anchored in each of the beads (5) and extends in the sidewalls (4) as far as the crown (2), a crown reinforcement or belt (10) that extends in the crown (2) in the circumferential direction (X) and is situated radially between the carcass reinforcement (7) and the tread (3). The carcass reinforcement (7) is, in the known way, made up of at least one rubber ply reinforced with textile cords referred to as "radial", which are disposed practically parallel to one another and extend from one bead to the other so as to make an angle generally between 80° and 90° with the median circumferential plane M; in this case, by way of example, it is wrapped around two bead wires (6) in each bead (5), the turn-up (8) of this reinforcement (7) being, for example, disposed towards the outside of the tyre (1) which is shown in this case as mounted on its rim (9).

According to the present invention, and in accordance with the depiction in FIG. 2 which will be described in detail later on, the belt (10) of the tyre (1) comprises a multilayer composite laminate comprising three superposed layers (10a, 10b, 10c) of reinforcers, said reinforcers being unidirectional within each layer and embedded in a thickness of rubber (C1, C2, C3, respectively), with:
  on the tread side, a first layer of rubber (C1) comprising a first row of reinforcers (110) which are oriented at an angle alpha ($\alpha$) of −5 to +5 degrees with respect to the circumferential direction (X), these reinforcers (110), referred to as first reinforcers, being made of a heat-shrinkable textile material;
  in contact with and disposed radially beneath the first layer (C1), a second layer of rubber (C2) comprising a second row of reinforcers (120) which are oriented at a given angle beta ($\beta$), positive or negative, of between 10 and 30 degrees with respect to the circumferential direction (X), these reinforcers (120), referred to as second reinforcers, being metal reinforcers;
  in contact with and disposed radially beneath the second layer (C2), a third layer of rubber (C3) comprising a third row of reinforcers (130) which are oriented at an angle gamma ($\gamma$) the opposite of the angle beta, said angle gamma itself being between 10 and 30 degrees with respect to the circumferential direction (X), these reinforcers (130), referred to as third reinforcers, being metal reinforcers.

According to the invention, the angles $\beta$ and $\gamma$, of opposite direction, which are both between 10° and 30°, may be identical or different, that is to say that the second (120) and third (130) reinforcers may be disposed symmetrically or non-symmetrically on each side of the median circumferential plane (M) defined above.

In this tyre shown schematically in FIG. 1, it will of course be understood that the tread 3, the multilayer laminate 10 and the carcass reinforcement 7 may or may not be in contact with one another, even though these parts have been deliberately separated in FIG. 1, schematically, for the sake of simplicity and to make the drawing clearer. They could be physically separated, at the very least for a portion of them, for example by tie gums, well known to a person skilled in the art, that are intended to optimize the cohesion of the assembly after curing or crosslinking.

In the tyre of the invention, the first reinforcers (110) made of heat-shrinkable textile material are monofilaments or assemblies of these monofilaments, such monofilaments, taken individually, having a diameter (or, by definition, a thickness if the monofilament does not have a substantially circular cross section) denoted $\varphi$ which is greater than 0.10 mm, preferably between 0.15 and 0.80 mm, in particular between 0.20 and 0.60 mm.

The (mean) envelope diameter D1 of these first textile reinforcers (110) is for its part between 0.20 mm and 1.20 mm, preferably between 0.30 and 1.00 mm, in particular between 0.40 and 0.80 mm; in other words, in the particular but most frequent case in which the reinforcer (110) consists of an individual textile monofilament with a circular cross section, said textile monofilament has a diameter $\varphi$ which is necessarily greater than 0.20 mm. The envelope diameter is understood to mean, in the usual way, the diameter of the imaginary cylinder of revolution that surrounds such first textile reinforcers (110) in the general case in which these reinforcers do not have a circular cross section.

The second (120) and third (130) reinforcers consist of steel monofilaments of which the diameter (or by definition the thickness if the monofilament does not have a circular cross section), denoted D2 and D3 respectively, is between 0.20 mm and 0.50 mm, preferably greater than 0.25 mm and less than 0.40 mm. More preferably, for optimum endurance of the tyre of the invention, notably under harsh running conditions, it is preferable for D2 and D3 to be in a range from 0.28 to 0.35 mm.

A steel "monofilament" means in this case any individual steel filament, whatever the shape of its cross section, the diameter (in the case of a circular cross section) or thickness D (in the case of a non-circular cross section) of which is greater than 100 µm. This definition therefore covers both monofilaments with an essentially cylindrical shape (with a circular cross section) and monofilaments with a different shape, for example elongate monofilaments (with a flattened shape), or with a rectangular or square cross section; in the case of a non-circular section, the ratio of the longest dimension to the shortest dimension of the cross section is preferably less than 50, more preferably less than 30, and in particular less than 20.

Given this general definition, in the tyre of the invention, the diameter or thickness D (D2 and D3, respectively) of the second (120) and third (130) steel reinforcers is in all cases greater than 0.20 mm.

This tyre of the invention has the following as further essential features:
  the density $d_1$ of the first reinforcers (110) in the first layer of rubber (C1), measured in the axial direction (Y), is between 70 and 130 threads/dm (decimeter, that is to say per 100 mm of rubber layer);
  the density, $d_2$ and $d_3$, respectively, of the second (120) and third (130) reinforcers in the second (C2) and third (C3) layers of rubber respectively, measured in the axial direction (Y), is between 100 and 180 threads/dm;
  the above features being measured in particular and preferably in the central part of the belt of the tyre in the vulcanized state, on each side of the median plane (M) over a total axial width of 10 cm (namely between −5 cm and +5 cm with respect to the median plane M).

Preferably, the following features are satisfied:
  the density $d_1$ is between 80 and 120, more preferably between 90 and 110 threads/dm;
  the densities $d_2$ and $d_3$ are between 110 and 170, more preferably between 120 and 160 threads/dm.

Furthermore, and according to another preferred embodiment of the invention, at least one of the following features is satisfied (more preferably all of them):

the mean thickness $Ez_1$ of rubber separating a first reinforcer 110 (of the first layer C1) from the second reinforcer 120 (of the second layer C2) closest to it, measured in the radial direction (Z), is between 0.20 and 0.40 mm;

the mean thickness $Ez_2$ of rubber separating a second reinforcer 120 (of the second layer C2) from the third reinforcer 130 (of the third layer C3) closest to it, measured in the radial direction (Z), is between 0.35 and 0.60 mm;

the total thickness of the multilayer composite laminate, that is to say of its three superposed layers (C1, C2, C3), measured in the radial direction Z, is between 1.8 and 2.7 mm, these features preferably being measured in the central part of the belt of the tyre in the vulcanized state, on each side of the median plane (M) over a total axial width of 10 cm (namely between −5 cm and +5 cm with respect to the median plane M).

All the data (D1, D2, D3, $d_1$, $d_2$, $d_3$, $Ez_1$ and $Ez_2$) indicated above are mean values measured experimentally by an operator on photographs of radial sections of tyres taken through the central part of the belt, as indicated above, 5 cm on each side of the median plane (M), namely over a total width of 10 cm.

More preferably, for an optimized performance in terms of rolling resistance, drift thrust and running endurance, at least one of the following features is satisfied (more preferably all of them):

the mean thickness $Ez_1$ of rubber separating a first reinforcer 110 (of the first layer C1) from the second reinforcer 120 (of the second layer C2) closest to it, measured in the radial direction (Z), is between 0.20 and 0.35 mm;

the mean thickness $Ez_2$ of rubber separating a second reinforcer 120 (of the second layer C2) from the third reinforcer 130 (of the third layer C3) closest to it, measured in the radial direction (Z), is between 0.35 and 0.55 mm;

the total thickness of the multilayer composite laminate, that is to say of its three superposed layers (C1, C2, C3), measured in the radial direction Z, is between 2.0 and 2.5 mm.

Figure 2:
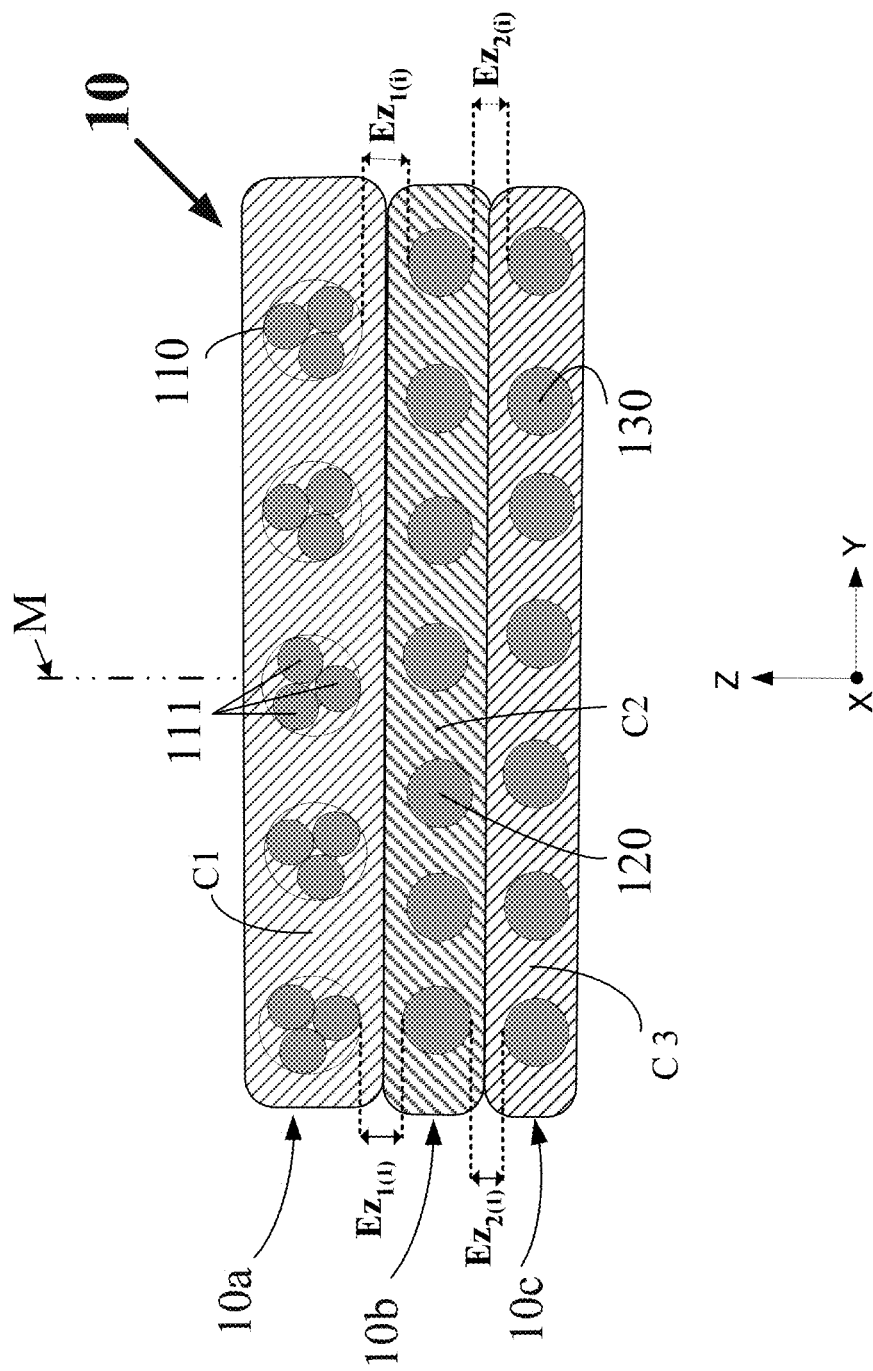
Figure 3:
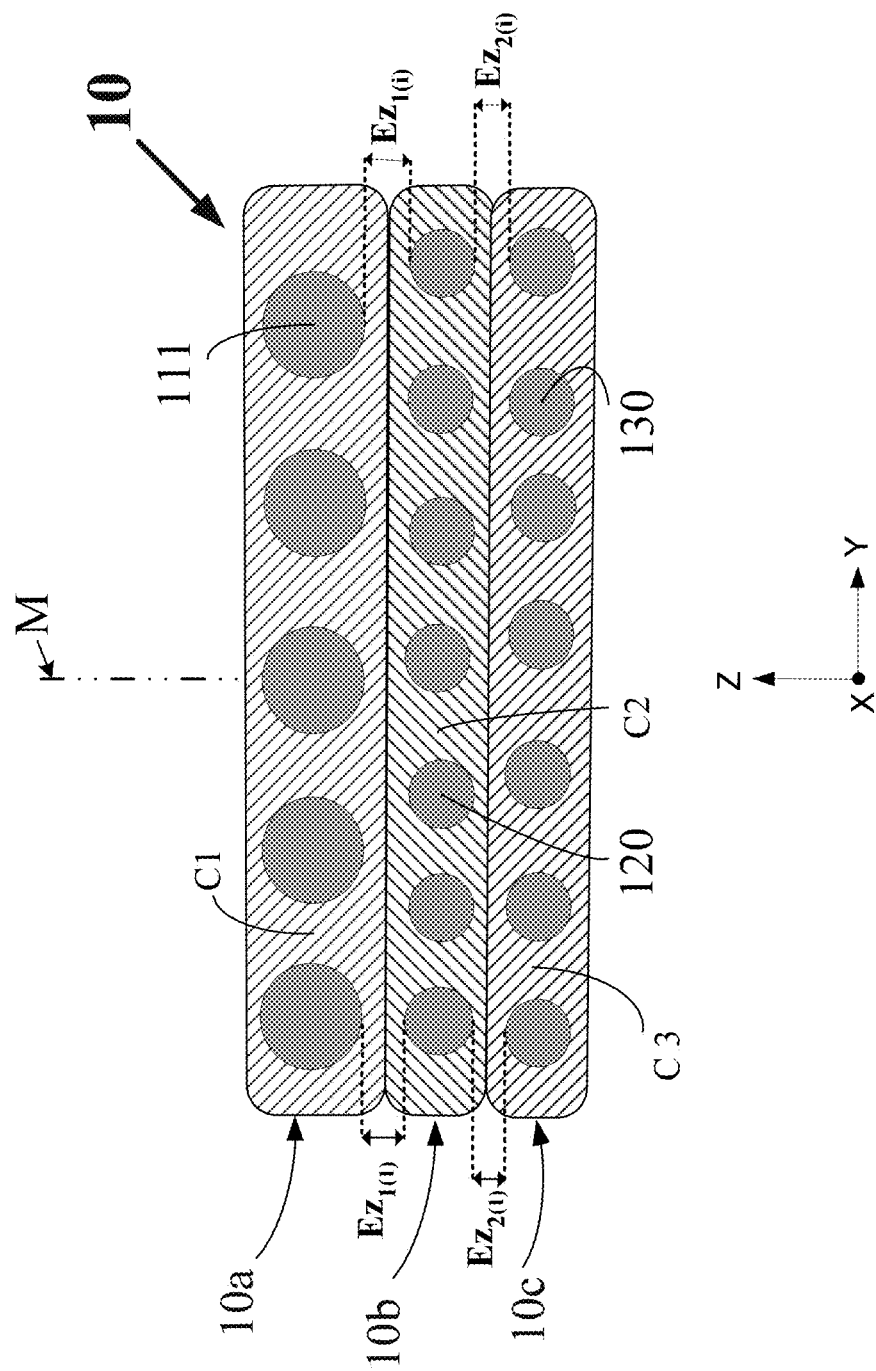

FIGS. 2 and 3 schematically show (without being drawn to any particular scale), in cross section, two examples of a multilayer composite laminate (10a, 10b, 10c) used as a belt (10) in the tyre (1) according to the invention in FIG. 1, the laminate (10) using reinforcers (110) made of heat-shrinkable textile material in the form of an assembly of three monofilaments (FIG. 2) or of an individual monofilament (FIG. 3), respectively.

As illustrated in FIGS. 2 and 3, $Ez_1$ is the mean of the thicknesses ($Ez_{1(1)}$, $Ez_{1(2)}$, $Ez_{1(3)}$, . . . , $Ez_{1(i)}$) of rubber separating a first reinforcer (110) from the second reinforcer (120) closest to it, these thicknesses each being measured in the radial direction Z and averaged over a total axial distance between −5.0 cm and +5.0 cm with respect to the centre of the belt (namely, for example, to a total of around 100 measurements if there are ten reinforcers (110) per cm in the layer C1).

Expressed differently, $Ez_1$ is the mean of the minimum distances $Ez_{1(i)}$ separating each first reinforcer (110) "back-to-back" from the second reinforcer (120) closest to it in the radial direction Z, this mean being calculated over all the first reinforcers (110) present in the central part of the belt, in an axial interval extending between −5 cm and +5 cm with respect to the median plane M.

Similarly, $Ez_2$ is the mean of the thicknesses of rubber ($Ez_{2(1)}$, $Ez_{2(2)}$, $Ez_{2(3)}$, . . . , $Ez_{2(i)}$) separating a second reinforcer (120) from the third reinforcer (130) closest to it, measured in the radial direction Z, this mean being calculated over a total axial distance between −5.0 cm and +5.0 cm with respect to the centre of the belt. Expressed another way, these thicknesses represent the minimum distances which separate the second reinforcer (120) "back-to-back" from the third reinforcer (130) closest to it in the radial direction Z.

Expressed another way, $Ez_2$ is the mean of the minimum distances $Ez_{2(i)}$ separating each second reinforcer (120) "back-to-back" from the third reinforcer (130) closest to it in the radial direction Z, this mean being calculated over all the second reinforcers (120) present in the central part of the belt, in an axial interval extending between −5 cm and +5 cm with respect to the median plane M.

For an optimized performance in terms of rolling resistance, drift thrust and running endurance, the tyre of the invention preferably satisfies at least one of the following inequalities (more preferably all three):

$$0.20 < Ez_1/(Ez_1 + D1 + D2) < 0.30$$

$$0.30 < Ez_2/(Ez_2 + D2 + D3) < 0.50$$

$$0.325 < (Ez_1 + Ez_2)/(Ez_1 + Ez_2 + D1 + D2 + D3) < 0.425.$$

The thermal contraction (denoted CT) of the first reinforcers (110) made of heat-shrinkable textile material, after 2 min at 185° C., is preferably less than 7.5%, more preferably less than 6.5%, in order to optimize tyre manufacture. CT is even more preferably less than 5.0%, in particular less than 4.5%, these values having proven to be optimal for the manufacturing and dimensional stability of tyre casings, in particular during the phases of curing and cooling thereof.

It is the relative contraction of these first reinforcers (110) under the test conditions mentioned below. The parameter CT is measured, unless specified otherwise, in accordance with the standard ASTM D1204-08, for example on an apparatus of the "TESTRITE" type under what is known as a standard pretension of 0.5 cN/tex (which is therefore expressed with respect to the titer or linear density of the test specimen being tested). At constant length, the maximum force of contraction (denoted $F_C$) is also measured using the above test, this time at a temperature of 180° C. and under 3% elongation. This force of contraction $F_C$ is preferably higher than 20 N (Newtons). A high force of contraction has proven to be particularly beneficial to the hooping capability of the first reinforcers (110) made of heat-shrinkable textile material with respect to the crown reinforcement of the tyre when the latter heats up under high running speeds.

The above parameters CT and $F_C$ can be measured without distinction on the adhesive-coated initial textile reinforcers before they are incorporated into the laminate and then into the tyre, or alternatively can be measured on these reinforcers once they have been extracted from the central zone of the vulcanized tyre and preferably "derubberized" (that is to say rid of the rubber which coats them in the layer C1).

Any heat-shrinkable textile material is suitable, and in particular and preferably a textile material that satisfies the contraction features CT mentioned above is suitable. Preferably, this heat-shrinkable textile material is selected from the group consisting of polyamides, polyesters and polyketones. Among the polyamides, mention may be made notably of the polyamides PA-4,6, PA-6, PA-6,6, PA-11 or PA-12. Among the polyesters, mention may be made, for example, of PET (polyethylene terephthalate), PEN (polyethylene naphthalate), PBT (polybutylene terephthalate), PBN (polybutylene naphthalate), PPT (polypropylene terephthalate) and PPN (polypropylene naphthalate). Hybrid reinforcers made up of two (at least two) different materials such as aramid/nylon, aramid/polyester, aramid/polyketone monofilament assemblies, for example, can also be used, in particular and preferably provided that they satisfy the CT characteristic recommended above.

FIGS. 4A-4F schematically shows, in cross section, various examples (112, 113, 114, 115, 116, 117) of assemblies of (respectively 2, 3, 4, 5, 6 and 7) monofilaments (111) made of heat-shrinkable textile material such as polyamide, polyester or polyketone, for example, that can be used as reinforcers (110) in the first layer (10*a*) of the multilayer composite laminate according to the invention.

Such assemblies and the methods for manufacturing them are well known to a person skilled in the art; they have been described in numerous documents, for example in the patents or patent applications FR 1 495 730, FR 2 022 643 or U.S. Pat. No. 3,638,706, FR 2 577 478 or U.S. Pat. No. 4,724,881, EP 500 480 or U.S. Pat. No. 5,442,903, EP 517 870 or U.S. Pat. No. 5,427,165, WO 2010/143017, and in "Investigation of twisted monofilament cord properties made of nylon 6.6 and polyester", B. Yilmaz, Fibers and Polymers 2011, vol. 12, No. 8, 1091-1098. They are commercially available, for example from the company Kordsa Global under the name "Monolyx".

According to the invention, these assemblies of monofilaments preferably comprise 2 to 10, more preferably 3 to 7 monofilaments made of heat-shrinkable textile material such as polyamide, polyester or polyketone. These monofilaments are twisted together with a torsion of generally between 30 and 100 to 200 turns per meter.

By definition, the second (120) and third (130) reinforcers are steel monofilaments. Preferably, the steel is a carbon steel such as the steels used in cords of the "steel cords" type for tyres; however it is of course possible to use other steels, for example stainless steels, or other alloys.

According to one preferred embodiment, when a carbon steel is used, its carbon content (% by weight of steel) is in a range from 0.5% to 1.2%, more preferably from 0.7% to 1.0%. The invention applies in particular to steels of the normal tensile (NT) or high tensile (HT) steel cord type, the (second and third) reinforcers made of carbon steel then having a tensile strength (Rm) preferably higher than 2000 MPa, more preferably higher than 2500 MPa. The invention also applies to super high tensile (SHT), ultra high tensile (UHT) or megatensile (MT) steels of the steel cord type, the (second and third) reinforcers made of carbon steel then having a tensile strength (Rm) preferably higher than 3000 MPa, more preferably higher than 3500 MPa. The total elongation at break (At) of these reinforcers, which is the sum of the elastic elongation and the plastic elongation, is preferably greater than 2.0%.

As far as the (second and third) reinforcers made of steel are concerned, the measurements of force at break, strength at break denoted Rm (in MPa) and elongation at break denoted At (total elongation in %) are taken under tension in accordance with ISO standard 6892 of 1984.

The steel used, whether it is in particular a carbon steel or a stainless steel, may itself be coated with a layer of metal which improves for example the workability of the steel monofilament or the wear properties of the reinforcer and/or of the tyre themselves, such as properties of adhesion, corrosion resistance or even resistance to ageing. According to one preferred embodiment, the steel used is covered with a layer of brass (Zn—Cu alloy) or zinc; it will be recalled that during the thread manufacturing process, coating the thread with brass or zinc makes the thread easier to draw and makes the thread bond to the rubber better. However, the reinforcers could be covered with a thin layer of metal other than brass or zinc, having for example the function of improving the corrosion resistance of these threads and/or their adhesion to the rubber, for example a thin layer of Co, Ni, Al, of an alloy of two or more of the Cu, Zn, Al, Ni, Co, Sn compounds.

Each layer (C1, C2, C3) of rubber composition (or "layer of rubber" below) of which the multilayer composite laminate is made is based on at least one elastomer and one filler.

Preferably, the rubber is a diene rubber, that is to say, as will be recalled, any elastomer (single elastomer or blend of elastomers) which is derived, at least in part (i.e. a homopolymer or copolymer) from diene monomers, that is to say monomers which bear two carbon-carbon double bonds, whether these are conjugated or not.

This diene elastomer is more preferably selected from the group consisting of polybutadienes (BR), natural rubber (NR), synthetic polyisoprenes (IR), butadiene copolymers, isoprene copolymers and blends of these elastomers, such copolymers being notably selected from the group consisting of butadiene-styrene copolymers (SBR), isoprene-butadiene copolymers (BIR), isoprene-styrene copolymers (SIR) and isoprene-butadiene-styrene copolymers (SBIR).

One particularly preferred embodiment consists in using an "isoprene" elastomer, that is to say an isoprene homopolymer or copolymer, in other words a diene elastomer selected from the group consisting of natural rubber (NR), synthetic polyisoprenes (IRs), various isoprene copolymers and mixtures of these elastomers.

The isoprene elastomer is preferably natural rubber or a synthetic polyisoprene of the cis-1,4 type. Among these synthetic polyisoprenes, use is preferably made of polyisoprenes having a content (mol %) of cis-1,4-bonds of greater than 90%, even more preferably greater than 98%. According to one preferred embodiment, each layer of rubber composition contains 50 to 100 phr of natural rubber. According to other preferred embodiments, the diene elastomer may consist, in full or in part, of another diene elastomer such as, for example, an SBR elastomer used as a blend with another elastomer, for example of the BR type, or used alone.

Each rubber composition may contain a single or several diene elastomer(s), and also all or some of the additives usually employed in the rubber matrices intended for the manufacture of tyres, such as, for example, reinforcing fillers such as carbon black or silica, coupling agents, anti-ageing agents, antioxidants, plasticizers or extension oils, whether the latter are aromatic or non-aromatic in nature (notably oils that are very slightly aromatic, if at all, for example of the naphthene or paraffin type, with high or preferably low viscosity, IVIES or TDAE oils), plasticizing resins with a high glass transition temperature (higher than 30° C.), agents that improve the processability of the compositions in the raw state, tackifying resins, anti-reversion agents, methylene acceptors and donors such as HMT (hexamethylenetetramine) or H3M (hexamethoxymethylmelamine) for example, reinforcing resins (such as resorcinol or bismaleimide), known adhesion promoter systems of the metal salt type, for example, notably salts of cobalt, nickel or lanthanide, a crosslinking or vulcanization system.

Preferably, the system for crosslinking the rubber composition is a system referred to as a vulcanization system, that is to say one based on sulphur (or on a sulphur donor agent) and a primary vulcanization accelerator. Various known vulcanization activators or secondary accelerators may be added to this basic vulcanization system. Sulphur is used at a preferred content of between 0.5 and 10 phr, and the primary vulcanization accelerator, for example a sulphenamide, is used at a preferred content of between 0.5 and 10 phr. The content of reinforcing filler, for example of carbon black and/or silica, is preferably higher than 30 phr, notably between 30 and 100 phr.

All carbon blacks, notably blacks of the HAF, ISAF, SAF type, conventionally used in tyres (blacks referred to as tyre grade blacks) are suitable as carbon black. Among the latter, more particular mention will be made of carbon blacks of (ASTM) grade 300, 600 or 700 (for example N326, N330, N347, N375, N683, N772). Precipitated or pyrogenic silicas having a BET surface area of less than 450 m²/g, preferably from 30 to 400 m²/g, are notably suitable as silicas.

A person skilled in the art will know, in light of the present description, how to adjust the formulation of the rubber compositions in order to achieve the desired levels of properties (especially modulus of elasticity), and to adapt the formulation to suit the specific application envisaged.

Preferably, each rubber composition has, in the cross-linked state, a secant modulus in extension, at 10% elongation, of between 4 and 25 MPa, more preferably between 4 and 20 MPa; values notably between 5 and 15 MPa have proven to be particularly suitable. Modulus measurements are made under tension, unless otherwise indicated in accordance with the standard ASTM D 412 of 1998 (test specimen "C"): the "true" secant modulus (that is to say the one with respect to the actual cross section of the test specimen) is measured in second elongation (that is to say after an accommodation cycle) at 10% elongation, denoted here by Ms and expressed in MPa (under standard temperature and relative humidity conditions in accordance with standard ASTM D 1349 of 1999).

In order to cause the first, second and third reinforcers to adhere to their three respective layers of rubber (C1, C2, C3) described above, use may be made of any suitable adhesive system, for example a textile glue of the "RFL" (resorcinol-formaldehyde-latex) or equivalent type as far as the first textile reinforcers are concerned, or for example an adhesive coating such as brass or zinc as far as the second and third reinforcers made of steel are concerned; however, it is also possible to use a plain, i.e. non-coated, steel.

6. EXEMPLARY EMBODIMENTS OF THE INVENTION

The following tests demonstrate that, by virtue of its specific construction, the multilayer composite laminate according to the invention makes it possible to reduce the weight and therefore the rolling resistance of the tyres, at a cost that is lower notably by virtue of the use of non-cabled steel monofilaments, all this being achieved first and foremost without impairing the cornering stiffness or overall endurance of these tyres.

These comparative tests were carried out on passenger vehicle tyres of size 205/55 R16 that have been manufactured in a conventional manner and are identical in all respects except for the construction of their multilayer composite laminate.

A) Tyres Tested

Figure 4A:
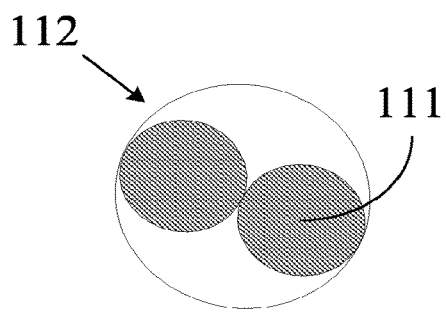
Figure 4B:
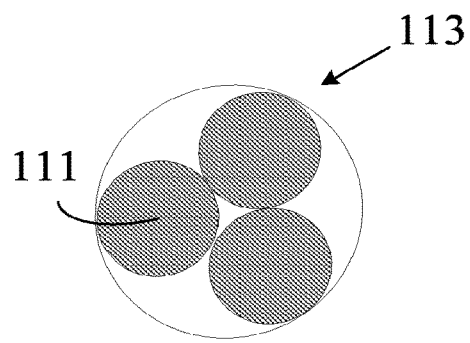
Figure 4C:
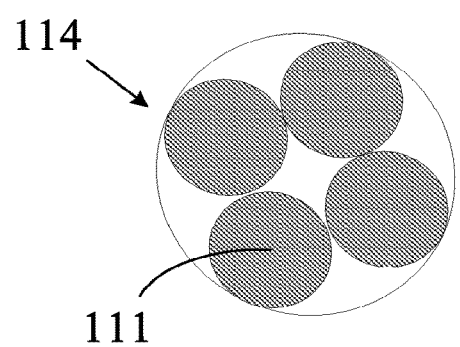
Figure 4D:
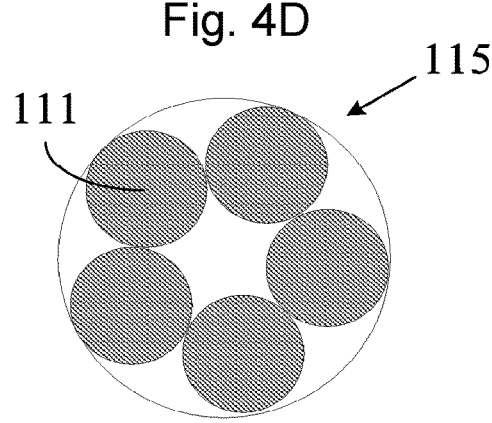
Figure 4E:
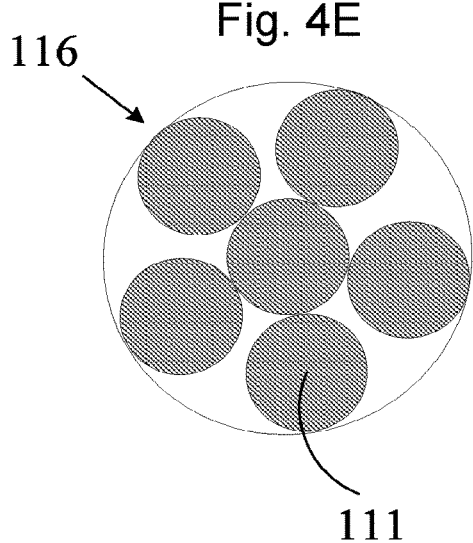
Figure 4F:
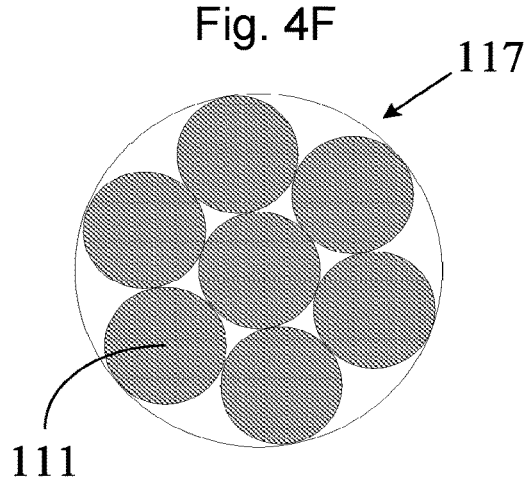

In the tyres according to the invention of these examples, according to the schematic depiction in FIGS. 2 and 4B, the textile reinforcers (110) are known assemblies (113) of monofilaments of construction "0.30×3", as shown schematically in FIG. 4B, each assembly (113) consisting of three monofilaments (111) made of polyamide (nylon 6,6), with an individual diameter φ equal to around 0.30 mm (individual titer of around 80 tex), all three of which have been assembled (twisted) together with a torsion of 50 turns/meter.

The diameter D1 (as will be recalled, the envelope diameter measured in the laminate and the tyre according to the invention) of these assemblies (113) is equal to around 0.65 mm; their CT is equal to around 3.6% and their force of contraction Fc is equal to around 5.2 N.

The first layer of rubber (C1) coating the textile reinforcers (113) is a rubber composition that is conventional for the calendering of textile reinforcers, based on natural rubber, carbon black, a vulcanization system and conventional additives; the adhesion between the polyamide reinforcers and the layer of rubber is ensured in the known way, for example using a simple textile glue of the "RFL" (resorcinol-formaldehyde-latex) type.

To manufacture this first layer (C1) the textile reinforcers (113) were calendered between two layers of rubber composition in the raw (unvulcanized) state, each having a thickness of approximately 0.25 mm, in a way well known to a person skilled in the art.

The metal reinforcers (120) and (130) are micro-alloyed carbon steel monofilaments (0.9% carbon) of SHT type having a strength Rm of around 3200 MPa (breaking force 226 N), a total elongation At of 2.3%, and a diameter (D2, D3) of 0.30 mm.

The second (C2) and third (C3) layers of rubber coating these steel monofilaments (120, 130) consist of a composition that is conventional for the calendering of metal tyre belt plies, typically based on natural rubber, carbon black, a vulcanization system and conventional additives such as cobalt salts as adhesion promoters.

To manufacture these two layers (C2, C3), monofilaments (130) were calendered between two layers of rubber composition in the raw (unvulcanized) state, each having a thickness of around 0.32 mm, in a way well known to a person skilled in the art.

The density $d_1$ of the textile reinforcers (113) in the first layer (C1), measured in the axial direction (Y), is equal to around 100 threads/dm, and that ($d_2$ et $d_3$, respectively) of the second (120) and third (130) steel monofilaments is equal to around 140 threads/dm.

Thus, in a range extending axially between −5 cm and +5 cm on each side of the median plane M, there are around 100 (namely 50 on each side) textile reinforcers (113) and around 140 (namely 70 on each side) second (120) and third (130) steel monofilaments.

The measured mean thickness $Ez_1$ of rubber separating these textile reinforcers (113) from the steel monofilaments (120) was equal to around 0.27 mm, while the mean thickness $Ez_2$ of rubber separating the steel monofilaments (120) from the other steel monofilaments (130) was around 0.48 mm. The total mean thickness of the laminate according to the invention, measured in the radial direction, was equal to around 2.3 mm.

Thus, in this example according to the invention, it will be noted that the three inequalities below, which are particularly preferred, are indeed satisfied:

$$0.20 < Ez_1/(Ez_1+D1+D2) < 0.30$$

$$0.30 < Ez_2/(Ez_2+D2+D3) < 0.50$$

$$0.325 < (Ez_1+Ez_2)/(Ez_1+Ez_2+D1+D2+D3) < 0.425.$$

All the data (D1, D2, D3, $d_1$, $d_2$, $d_3$, $Ez_1$ and $Ez_2$) indicated above are mean values measured experimentally by an operator on photographs of radial sections of tyres taken through the central part of the belt, as indicated above, 5 cm on each side of the median plane (M).

The control tyres used have the same architecture as the tyres of the invention except for the following technical features: the metal reinforcers (120, 130) consist of conventional "2.30" design cords of SHT steel (rupture force around 470 N) consisting of 2 threads of diameter 0.30 mm cabled together at a pitch of 14 mm; the diameter (envelope) of these cords is therefore 0.6 mm; they are disposed at a density of around 85 threads/dm; the reinforcers (110) are folded yarns made of polyamide 6,6, each folded yarn consisting of 2 spun yarns of 140 tex which have been twisted together (on a direct cabling machine) at 250 turns/meter, with a diameter D1 equal to around 0.66 mm; their CT is equal to around 7% and their force of contraction Fc is equal to around 28 N; the measured mean thickness $Ez_1$ of rubber separating the nylon folded yarns (110) from the steel cords (120) was approximately 0.31 mm while the measured mean thickness $Ez_2$ of rubber separating the steel cords (120) was around 0.50 mm. The total mean thickness of the laminate, measured in the radial direction, was equal to around 3.0 mm.

To manufacture the two metal layers above, "2.30" cords were calendered between two layers of rubber composition in the raw (unvulcanized) state, each having a thickness of around 0.40 mm, in a way well known to a person skilled in the art.

In the multilayer composite laminate of these control tyres, it may be noted in particular that, unlike in the case of the invention, none of the following three inequalities is satisfied:

$$0.20 < Ez_1/(Ez_1+D1+D2) < 0.30$$

$$0.30 < Ez_2/(Ez_2+D2+D3) < 0.50$$

$$0.325 < (Ez_1+Ez_2)/(Ez_1+Ez_2+D1+D2+D3) < 0.425.$$

B) Results of Comparative Tests

In a first series of tests carried out on machines, it was first of all noted that the tyres of the invention, as compared with the control tyres, afforded:

- a weight saving of around 16% on the multilayer composite laminate, namely a weight saving of around 3% on the tyre itself;
- an improvement in rolling resistance of around 2% (namely around 0.150 kg/tonne);
- and, unexpectedly, despite this appreciable lightening of the belt, a very small reduction in drift thrust (of around −4%).

The rolling resistance was measured on a dynamometer according to the ISO 87-67 (1992) method. To measure the drift thrust, each tyre was driven at a constant speed of 80 km/h on a suitable automatic machine (machine of the "flat-track" type marketed by MTS), varying the load denoted "Z", for a cornering angle of 1 degree, and the cornering rigidity or drift thrust denoted "D" (corrected for the thrust at zero drift) was measured in the known way by recording, by way of sensors, the transverse load on the wheel as a function of this load Z; the drift thrust is the gradient of the D(Z) curve at the origin.

Next, actual running tests were then performed either on the machine or on a vehicle (a Volkswagen Golf) to compare the endurance of the control tyres and the tyres according to the invention under various driving conditions.

First of all, the endurance for very high-speed running was assessed by subjecting each tyre, on the machine, to a progressive increase in speed, in determined steps, up to a preset limiting speed (255 km/h) or where applicable until the tyres tested became destroyed before the end of the test.

Finally, endurance for very long term driving (40 000 km) under very harsh conditions was also tested, on an automatic running machine, according to various predetermined pressure and overload cycles at constant speed; after that, each tested tyre was stripped and the overall condition of its multilayer composite laminate was observed, particularly in the shoulder regions of the tyres which, as is known, suffer the greatest heating.

At the end of this second series of tests, it was found that the tyres according to the invention, compared with the control tyres, exhibited, in a surprising manner to a person skilled in the art:

- equivalent endurance for high-speed running (no noted destruction of the tyres tested in both cases);
- and finally, equivalent endurance for very long term driving under extremely harsh running conditions (equivalent overall condition of the multilayer composite laminate according to the invention compared with the control composite laminate).

Thus, provided that all of the essential technical features explained above are observed, notably provided that use is made, on the one hand, of textile circumferential reinforcers (110) in the form of monofilaments or assemblies of monofilaments with a large diameter, the heat-shrinkability of which is furthermore preferably controlled and, on the other hand, of metal reinforcers (120, 130) in the form of small-diameter monofilaments, within the recommended limits of building, it was found that it was still possible to appreciably reduce the overall thickness of the tyre belts without impeding the workability and differentiation of the functions firstly of hooping afforded by the circumferential reinforcers of the first layer and secondly of stiffening afforded by the metal reinforcers of the other two layers.

Unexpectedly, the invention allows the weight and rolling resistance of passenger vehicle or van tyres to be reduced without impairing the cornering stiffness and, therefore, road holding and handling, while at the same time offering equivalent running endurance, even under particularly harsh running conditions.

The invention claimed is:

1. A radial tire, defined in three main directions, circumferential X, axial Y and radial Z, comprising:
   a crown surmounted by a tread;
   two sidewalls;
   two beads, each sidewall connecting a respective bead to the crown;
   a carcass reinforcement that is anchored in each of the beads and extends in the sidewalls as far as the crown;
   a belt that extends in the crown in the circumferential direction X and is situated radially between the carcass reinforcement and the tread, said belt comprising a multilayer composite laminate comprising at least three superposed layers of reinforcers, said reinforcers being unidirectional within each layer and embedded in a corresponding thickness of rubber C1, C2, and C3, respectively;
   wherein, on the tread side, a first layer of rubber C1 comprises a first row of reinforcers defined as first reinforcers, which are oriented at an angle alpha of −5 to +5 degrees with respect to the circumferential direction X and which are made of a heat-shrinkable textile material;

wherein, in contact with the first layer of rubber C1 and disposed beneath the latter, a second layer of rubber C2 comprises a second row of reinforcers defined as second reinforcers, which are oriented at a given angle beta, positive or negative, of between 10 and 30 degrees with respect to the circumferential direction X and which are metal reinforcers;

wherein, in contact with the second layer of rubber C2 and disposed beneath the latter, a third layer of rubber C3 comprises a third row of reinforcers defined as third reinforcers, which are oriented at an angle gamma the opposite of the angle beta, said angle gamma itself being between 10 and 30 degrees with respect to the circumferential direction X and which are metal reinforcers;

wherein the first reinforcers made of heat-shrinkable textile material are heat-shrinkable monofilaments with a diameter φ greater than 0.10 mm or assemblies of such monofilaments;

wherein an envelope diameter denoted D1 of the first reinforcers is between 0.20 mm and 1.20 mm;

wherein a density d1 of the first reinforcers in the first layer of rubber C1, measured in the axial direction Y, is between 70 and 130 threads/dm;

wherein the second and third reinforcers are steel monofilaments of which a diameter, denoted D2 and D3, respectively, is between 0.20 mm and 0.50 mm;

wherein a density, d2 and d3, respectively, of the second reinforcers and the third reinforcers in the second layer of rubber C2 and third layer of rubber C3, respectively, measured in the axial direction Y, is between 100 and 180 threads/dm; and wherein, measured in the central part of the belt of the tire in the vulcanized state, on each side of the median plane M over a total axial width of 10 cm:

the mean thickness $Ez_1$ of rubber separating a first reinforcer from a second reinforcer closest to it, measured in the radial direction Z, is between 0.20 and 0.40 mm, the mean thickness $Ez_2$ of rubber separating a second reinforcer from a third reinforcer closest to it, measured in the radial direction Z, is between 0.35 and 0.60 mm, and $Ez_1 < Ez_2$.

2. The tire according to claim 1, wherein the diameter φ is between 0.15 and 0.80 mm.

3. The tire according to claim 2, wherein the diameter φ is between 0.20 and 0.60 mm.

4. The tire according to claim 1, wherein D1 is between 0.30 and 1.00 mm.

5. The tire according to claim 4, wherein D1 is between 0.40 and 0.80 mm.

6. The tire according to claim 1, wherein the density d1 is between 80 and 120 threads/dm.

7. The tire according to claim 6, wherein the density d1 is between 90 and 110 threads/dm.

8. The tire according to claim 1, wherein D2 and D3 are each greater than 0.25 mm and less than 0.40 mm.

9. The tire according to claim 8, wherein D2 and D3 are each within a range from 0.28 to 0.35 mm.

10. The tire according to claim 1, wherein the densities d2 and d3 are each between 110 and 170 threads/dm.

11. The tire according to claim 10, wherein the densities d2 and d3 are each between 120 and 160 threads/dm.

12. The tire according to claim 1, wherein a thermal contraction CT of the first reinforcers made of heat-shrinkable textile material, after 2 min at 185° C., is less than 5.0%.

13. The tire according to claim 12, wherein the thermal contraction CT of the first reinforcers made of heat-shrinkable textile material, after 2 min at 185° C., is less than 4.5%.

14. The tire according to claim 1, wherein the following inequality is satisfied:

$$0.20 < Ez_1/(Ez_1 + D1 + D2) < 0.30,$$

where $Ez_1$ is the mean thickness of rubber separating a first reinforcer from a second reinforcer closest to it, measured in the radial direction Z, and where $Ez_2$ is the mean thickness of rubber separating a second reinforcer from a third reinforcer closest to it, measured in the radial direction Z.

15. The tire according to claim 1, wherein the following inequality is satisfied:

$$0.30 < Ez_2/(Ez_2 + D2 + D3) < 0.50,$$

where $Ez_1$ is the mean thickness of rubber separating a first reinforcer from a second reinforcer closest to it, measured in the radial direction Z, and where $Ez_2$ is the mean thickness of rubber separating a second reinforcer from a third reinforcer closest to it, measured in the radial direction Z.

16. The tire according to claim 1, wherein the following inequality is satisfied:

$$0.325 < (Ez_1 + Ez_2)/(Ez_1 + Ez_2 + D1 + D2 + D3) < 0.425,$$

where $Ez_1$ is the mean thickness of rubber separating a first reinforcer from a second reinforcer closest to it, measured in the radial direction Z, and where $Ez_2$ is the mean thickness of rubber separating a second reinforcer from a third reinforcer closest to it, measured in the radial direction Z.

17. The tire according to claim 1, wherein the steel of which the second and third reinforcers are made is a carbon steel.

18. The tire according to claim 1, wherein the heat-shrinkable textile material of which the first reinforcers are made is a polyamide or a polyester.

19. The tire according to claim 1, wherein the first reinforcers made of heat-shrinkable textile material are assemblies of 2 to 10 monofilaments.

20. The tire according to claim 19, wherein the first reinforcers made of heat-shrinkable textile material are assemblies of 3 to 7 monofilaments.

* * * * *